June 27, 1972   O. SZYMBER ET AL   3,672,757

AUTOMATIC FOCUSING SYSTEM FOR PROJECTORS AND THE LIKE

Filed Sept. 14, 1970   2 Sheets-Sheet 2

INVENTORS
OLEG SZYMBER
NORMAN SHIM
BY McDougall, Hersh + Scott
ATT'YS.

United States Patent Office 3,672,757
Patented June 27, 1972

3,672,757
AUTOMATIC FOCUSING SYSTEM FOR PROJECTORS AND THE LIKE
Oleg Szymber, Elk Grove, and Norman Shim, Glenview, Ill., assignors to GAF Corporation, New York, N.Y.
Filed Sept. 14, 1970, Ser. No. 72,076
Int. Cl. G03b 3/00, 21/14
U.S. Cl. 353—101                15 Claims

ABSTRACT OF THE DISCLOSURE

A first appraisal sub-system includes a focusing lens mounted for movement with the projector objective lens to establish a focusing axis parallel with the projector optical axis. This sub-system includes a light source movably mounted on the focusing axis and detection means responsive to variations in the distances of such light source and the screen from the focusing lens and for moving the latter to maintain a predetermined relationship between such distances. A second appraisal sub-system includes other detection means for sensing buckling or popping of the transparency and for moving the aforementioned light source along the focusing axis in response to such buckling or popping.

BACKGROUND OF THE INVENTION

Slide projectors have been introduced to the market in recent years equipped with so-called automatic focusing systems. These systems are based on the automatic focusing system shown in Shurcliff Pat. 3,037,423. According to the Shurcliff patent, an appraisal sub-system including a beam of light is directed to the slide transparency and is reflected to a pair of photoelectric cells. Displacement of the transparency as a result of buckling, for example, will cause one photoelectric cell to be illuminated to a degree greater than the other cell. This unbalanced condition actuates motive means for moving the objective lens to establish focusing. The lens element forming part of the appraisal sub-system also moves with the objective lens thereby to rebalance the appraisal sub-system for deactivating the latter when focus is established. Additional patents representing such prior art systems are: Mitchell No. 2,947,215, Ewald et al. No. 3,205,744 and Stauffer No. 3,249,001.

The prior art systems disclosed in these patents are not actually automatic focusing systems in the true sense of the term as initial focus must be established by manual movement of the objective lens. The prior art systems are more properly characterized as systems for maintaining a preset distance between the slide transparency and the objective lens; these systems compensate only for displacement of the slide transparency. That is to say, these systems will not compensate for the transparency image being out of focus due to displacement of the screen, for example.

In the pending application of Oleg Szymber, Ser. No. 37,950, filed May 18, 1970 and assigned to the assignee of this application, a fully automatic focusing system is disclosed and claimed. According to this Szymber system, light is directed from its source to detection means along paths which are defined in part by the light being reflected from the transparency and from the screen. Displacement of the screen, objective lens or transparency will cause displacement of a beam of light with respect to the detection means thereby to activate the latter. Motive means operated by the detection means moves the objective lens thereby to establish focus of the transparency and to re-position the beam of wave energy on the detection means. The Szymber system does not require initial focus to be established manually. This system disclosed and claimed in the Szymber application is fully automatic and will not only establish focus initially but will maintain focus throughout a projection sequence.

The present invention is directed to the type of fully automatic system shown in the Szymber application. The invention of the present application embodies several improvements over such system.

OBJECTS OF THE INVENTION

A primary object of the present invention is the provision of a new and improved automatic focusing system for projectors.

Another object of the present invention is the provision of an automatic focusing system including a first appraisal sub-system for detecting variations in the distances of a light source and the screen from a focusing lens and for moving the latter and the objective lens in response to such variations and a second appraisal sub-system for detecting buckling or popping of the transparency and in response thereto for moving such light source.

These and other objects and advantages of the invention will become apparent from the following specification disclosing a preferred embodiment shown in the accompanying drawings.

DESCRIPTION OF A PREFERRED EMBODIMENT

For purposes of illustration, the present invention is shown and described as embodied in a photographic slide projector. However, it will be understood the invention is not to be limited for use with such slide projectors, as the invention has utility with other projection devices, such as moving picture projectors, for example.

Figure 1:
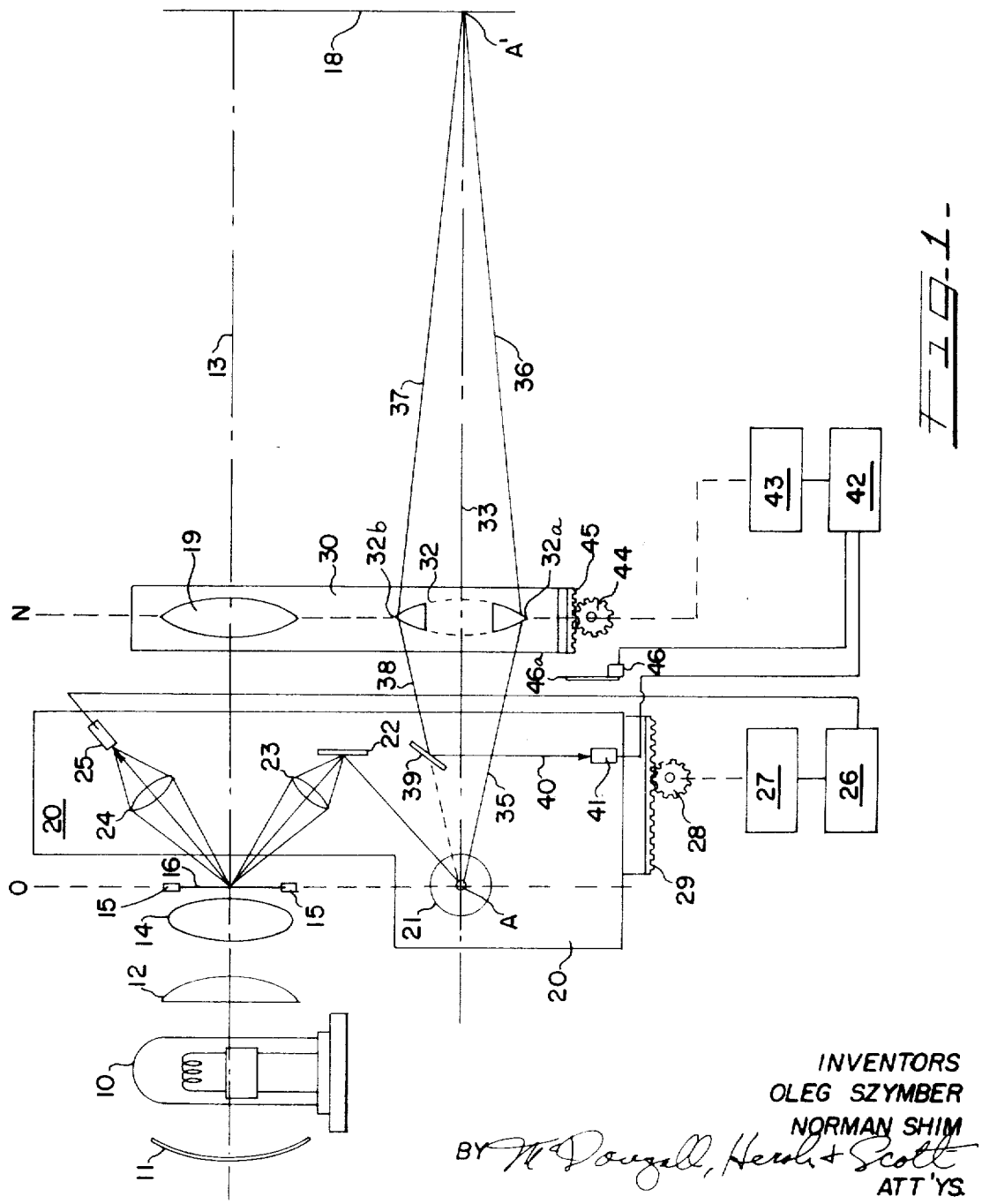
FIG. 1 is a side elevation, largely schematic, showing the present invention embodied in a photographic slide projector.

Referring to FIG. 1, the conventional components of a photographic slide projector of any suitable type are seen to include a projection bulb 10 mounted between a reflector 11 and a lens 12 for projecting light along the projector optical axis 13. Another lens 14 includes the usual heat filter for removing infrared energy thereby to cool the radiation used for projection.

Slide positioning elements, such as a pair of rails 15, slidably receive a slide transparency 16 for holding the same in a plane O perpendicular to the optical axis 13. In FIG. 1, the slide transparency 16 is shown in an unbuckled or unpopped configuration. The transparency image is projected on a screen 18 remote from the projector; an objective lens 19 is provided for bringing the image into sharp focus on such screen.

The present invention includes a frame or support 20 mounted by suitable means, such as rollers or slides (not shown), for movement in either direction along a path parallel with the optical axis 13. This frame mounts a source of wave energy or radiation, such as an incandescent bulb 21 having its filament defining a point A. Some of the radiation or light emitted from this bulb strikes a mirror 22 mounted on the frame 20. Wave energy reflected from this mirror is focused as a spot on the transparency 16 at the optical axis 13 (when the system is in a focused condition) by means of a lens 23. Wave energy reflected from the transparency 16 is focused by another lens 24 to detection means 25, such as a pair of photoelectric cell elements or other photoelectric devices responsive to displacement of wave energy thereon. It will be understood that the lenses 23, 24 and the detection means 25 are mounted on the frame 20 for being moved in unison thereby.

The detection means 25 is associated with suitable circuitry, shown only in block form and designated 26, for operating a reversible electric motor, also shown in block form and designated 27. A preferred circuit for operating the motor 27 in response to displacement of wave energy on detection means 25 is disclosed in the pending application of Oleg Szymber, Ser. No. 631,516, filed Apr. 17, 1967 and assigned to the assignee of this application.

The motor 27 drives a pinion gear 28 in meshing engagement with a rack 29, the latter being connected to the frame 20. It should be apparent that the motor 27 serves to move the frame 20 in either of its directions, depending on the direction of rotation of the reversible motor 27. As will be apparent herein, the mirror 22, lenses 23, 24, detection means 25 and the means activated thereby may be considered as defining an appraisal subsystem for sensing buckling or popping of the transparency 16 and for moving the support 20 to maintain a constant spatial relationship between the latter and the area of the transparency which is struck by the wave energy of the appraisal subsystem, i.e., the area of the transparency on or adjacent the optical axis 13.

A frame or support 30 is mounted for movement in either direction along the optical axis 13 by suitable means, such as rollers or slides (not shown). This frame carries the objective lens 19 and moves the latter in the appropriate direction to bring the transparency image into sharp focus on the screen 18 as will be explained herein. The frame 30 supports a focusing lens 32 for defining a focusing axis 33 parallel with the projector optical axis 13. The lens 32 may be identical to the objective lens 19. Since only peripheral portions of the lens 32 are used, such lens may be open or hollow at its center portion. In the embodiment shown for purposes of illustration, the lens 32 has the same focal length as the lens 19 and the lens 32 has its nodal point coplanar with the nodal point of the objective lens 19. The nodal points of these two lens may be considered as lying in a plane N perpendicular to the axes 13, 33.

Some of the wave energy emitted from the bulb 21, which may be designated by the wave energy beam 35, is focused by the peripheral portion 32a of the focusing lens along a beam 36 for forming a spot A' of such wave energy on the screen 18 at the focusing axis 33. Some of the wave energy which is reflected from the screen is designated by the beam 37; this beam of wave energy is focused by the lens portion 32b along a beam 38 and would, in accordance with the laws of optics, strike the bulb 21 at the point A if not for the interpositioning of a mirror 39 mounted on the frame 20 for movement therewith. The wave energy beam 38 is reflected by the mirror 39 to define a beam 40 which strikes suitable detection means 41, such as photoelectric cells or any other suitable photoelectric means responsive to the displacement of wave energy thereon.

The detection means 41 are connected in a circuit which is shown in block form and designated 42. This circuit may be of the type disclosed in the above mentioned application of Oleg Szymber, Ser. No. 37,950. This circuit operates a suitable reversible electric motor, also shown in block form and designated 43. This motor serves to rotate a pinion gear 44 in meshing engagement with a rack 45, the latter being connected with the frame 30. It will be apparent that the motor 43 serves to move the frame 30 in either of its directions depending on the direction of rotation of the reversible motor 43.

A limit switch 46 has an actuating arm 46a positioned so as to be engaged by the frame 30 to establish a limit for the direction of movement of the latter toward the transparency. As it will be explained below, the switch 46 is associated with the circuit 42 for reversing the direction of the motor 43 when the frame 30 engages the arm 46a.

The bulb 21, the focusing lens 32, mirror 39, detection means 41 and the motor activated thereby may be considered as defining another appraisal sub-system for sensing variations in the distances of the screen 18 and the light 21 from the lens 32 and for moving the latter to maintain a predetermined relationship between such distances. During the course of this movement of the lens 32, the objective lens 19 is of course also moved— this movement of the objective lens serves to bring a transparency image into sharp focus on the screen 18 as will be explained.

It will be understood that when the appraisal subsystem just referred to is in a stable condition or condition of equilibrium, all of the wave energy emitted from point A and focused by peripheral portions of the focusing lens 32 will converge at point A'. Conversely, all of the rays of wave energy reflected from point A' and focused by peripheral portions of the focusing lens 32 will converge at point A. The focusing lens 32 is movable along the focusing axis 33 and therefore is capable of focusing the wave energy of point A at point A' and vice versa. This stable condition or condition of equilibrium may be expressed by the well known optical formula:

$$\frac{1}{D}+\frac{1}{d}=\frac{1}{f}$$

wherein D is the distance between the lens 32 and the screen 18, d is the distance between the lens 32 and the filament of bulb 21 and f is the focal length of the lens 32.

Figure 2:
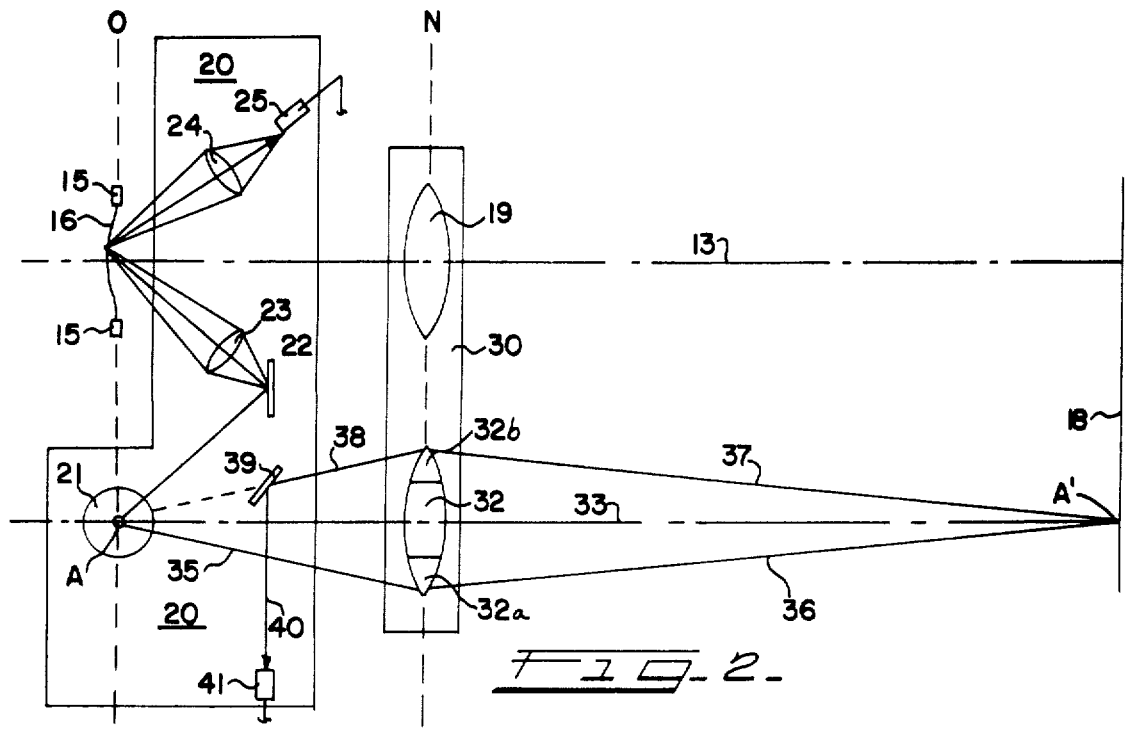
FIG. 2 is an elevation similar to FIG. 1 showing operation of one of the appraisal sub-systems in response to buckling of the transparency.
Figure 3:
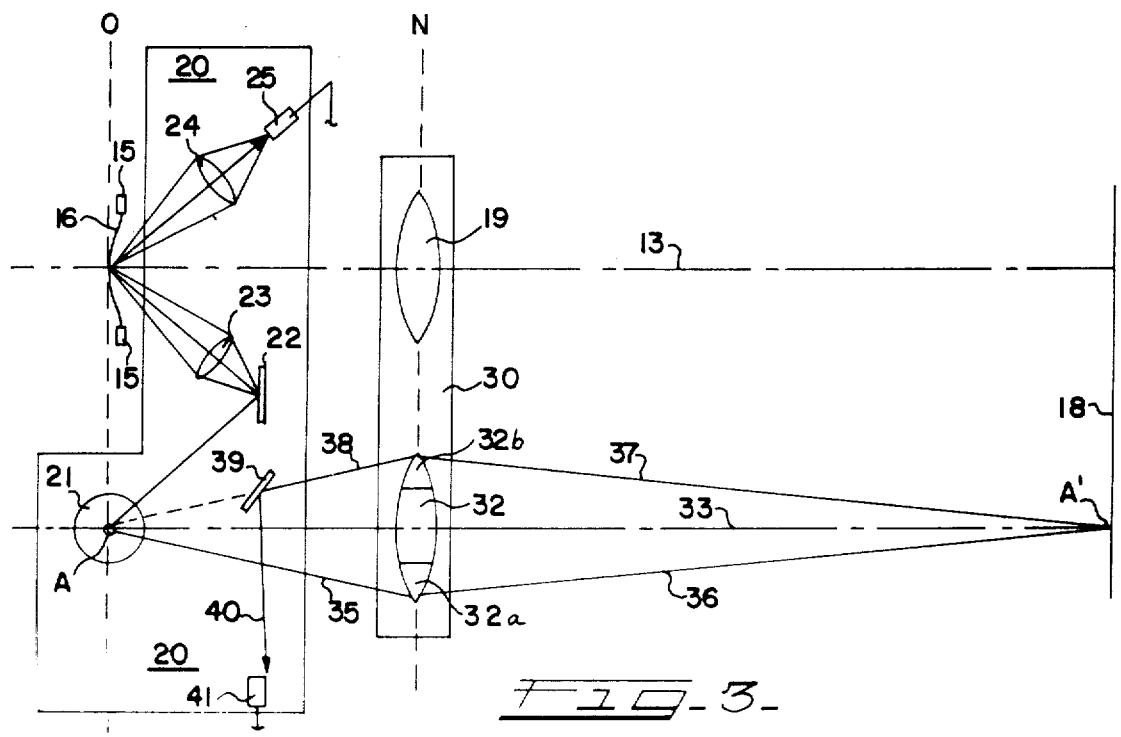
FIG. 3 is an elevation similar to FIG. 2 showing operation of the other appraisal sub-system in response to operation of the first mentioned appraisal sub-system.

At this time it should be mentioned that in the schematic drawings of FIGS. 1 through 3, these distances are not shown in proportion to one another. By way of example, in an actual slide projector with a lens having a focal length of 4 inches, when D is 10 feet (120 inches), d is 4.138 inches. It will be understood that when the appraisal sub-system including the lens 32 is in a stable state, the beam of wave energy 40 strikes the detection means 41 at a central or balanced position such that the latter does not serve to energize the motor 43.

OPERATION

FIG. 1 illustrates both appraisal sub-systems in a stable condition with the transparency 16 in perfect focus on the screen 18. Now assume that the slide buckles or pops the distance Δ (FIG. 2) from the plane defined by the slide positioning elements 15. It will be apparent that the wave energy reflected from the popped transparency will be focused on the detection means 25 unevenly so as to activate the latter and thereby energize the motor 27. The motor 27 will move the support 20 to the left a distance Δ establishing a new plane O with the filament of the bulb 21 being contained in such plane and thereby being coplanar with the portion of the transparency which is struck by the wave energy of the appraisal sub-system. It is apparent that the new plane O is shifted from its original position by the same distance Δ. Since the support 20 also carries the mirror 22, lenses 23, 24 and detection means 25, when the frame 20 is moved the distance Δ the wave energy reflected from the transparency will again be focused evenly on the detection means 25 thereby to deenergize the motor 27. It will be appreciated that the appraisal sub-system including the lenses 23, 24 and the detection means 25 acts to move the bulb 21 so as to follow the slide transparency 16 and thereby maintain a coplanar relationship between the filament of the bulb 21 and the portion of the transparency which is struck by the appraisal sub-system wave energy.

The aforedescribed movement of the bulb 21 will momentarily disturb the state of equilibrium of the appraisal sub-system which includes the lens 32 thereby causing the reflected wave energy beam 40 to illuminate the detection means 41 unevenly as seen in FIG. 3. This will result in energizing the motor 43 to move the frame 30. The frame 30 will move to the left a distance Δ and will move the objective lens 19 a corresponding distance thereby to bring the popped or buckled transparency into perfect focus on the screen 18. This movement of the frame 30 moves the focusing lens 32 in the same direction thereby causing the reflected energy beam 40 to return to the central or balanced position with respect to the detection means 41 thereby evenly illuminating the latter and de-energizing the motor 43, whereupon the appraisal sub-system including the lens 32 will be returned to a stable condition.

It will be apparent that if the slide transparency 16 buckles in the direction opposite that shown in FIG. 2, both of the frames 20 and 30 will be moved a distance Δ to the right for bringing the transparency image into sharp focus on the screen 18. If focus is upset by changing the screen-to-projector distance, only the detection means 41 is activated and the frame 30 only will be moved to restablish a focused condition. As explained above, the appraisal sub-system including the detection means 25 only serves as a means for moving the bulb 21 to follow displacements of the transparency. The bulb 21 forms part of the other appraisal sub-system including the lens 32.

The screen 18 may be spaced from the projector a considerable distance before the return signal defined by the wave energy reflected from the screen is rendered so weak that the detection means 41 will not be activated. By use of the circuit disclosed in the aforementioned Szymber application, Ser. No. 37,950, the motor 43 may be biased so as to move the frame 30 toward the transparency when the signal from the screen is too weak to activate the detection means 41. Under this condition, the frame 30 will continue movement in such direction until it engages the arm 46a whereupon the direction of rotation of the motor will be reversed and the latter will then be alternately energized for rotating in opposite directions. This will result in what might be termed a "hunting" mode of operation causing reciprocal movement of the lens 19, 32. This movement will be quite small, will not be perceptible to the average viewer, and will provide satisfactory focus over a range of distances.

For example, with a screen of average reflective properties, assume that the maximum screen-to-projector distance is 14 feet. Using the formula:

$$\frac{1}{D} + \frac{1}{d} = \frac{1}{f}$$

$d$ will be 4.097 inches with each of the lenses 19, 32 having a focal length of 4 inches. The switch arm 46a may be set to establish a limiting distance $d$ of 4.068 inches which will establish perfect focus when the screen-to-projector distance D is 20 feet. The switch 46 and associated circuitry 42 may be designed to oscillate or reciprocate the lenses between the distance $d$ of 4.068 inches and a distance $d$ of 4.085 inches, the latter establishing perfect focus for a distance D of 16 feet. It will be noted that this oscillation of the lenses is only .017 inch—this will result in "average" focusing for distances between 16 and 20 feet and satisfactory focus of all distances greater than 14 feet.

Any confusion between the light from the main projection bulb and the bulb 21 may be eliminated by making the detection means 25, 41 sensitive primarily to radiation which is high in infrared content. The radiation from the main projection bulb 10 is low in infrared energy because of the filter associated with the lens 14. The radiation from the bulb 21 is unfiltered and is relatively high in infrared content. As is known to those skilled in the art, photoelectric cells having a peak response in the infrared range are available. This propetry may be imparted to other photoelectric cells by the use of appropriate infrared filters.

It will be apparent that the positions of the bulb 21 and the mirror 22 could be interchanged and that the system would function in the same manner as described above. It is preferable that the nodal point of the focusing lens 32 be coplanar with the nodal point of the lens 19 and that a coplanar relationship be maintained between the filament of the bulb 21 and the area of the transparency which is struck by the appraisal sub-system wave energy. If these coplanar relationships are not adhered to, it would be necessary to provide special gearing or cams to move the frames 20, 30 the appropriate amounts to achieve focusing.

We claim:

1. In a projection device of the type including an element for positioning a transparency on an optical axis defined by an objective lens mounted between such element and a projection screen, a system for automatically focusing a transparency image on such screen comprising:

(a) a first appraisal sub-system including:
     (1) a source means for emanating wave energy;
     (2) first detection means adapted to receive wave energy emanating from said source means and responsive to the position of wave energy thereon;
     (3) first means for directing a beam of wave energy from said source means to said screen and for directing to said first detection means some of the wave energy which is reflected by said screen;
     (4) a first support movably mounting said objective lens and at least a portion of said first beam directing means;
     (5) first motive system controlled by said first detection means upon activation thereof and connected to said first support means for moving the same;

(b) a second appraisal sub-system including:
     (1) second detection means adapted to receive wave energy emanating from said source means and responsive to the position of wave energy thereon;
     (2) second means for directing a beam of wave energy from said source means to said second detection means along a path which is defined in part by said wave energy being reflected by said transparency;
     (3) second support means reciprocally movable with respect to said transparency positioning element along an axis parallel with the projector optical axis and carrying at least one of said means of each of said first and second appraisal sub-systems; and
     (4) second motive system controlled by said second detection means upon activation thereof and connected to said second support means for moving the same to maintain a predetermined spacial relationship between said second support means and said transparency.

2. The system according to claim 1 wherein said first beam directing means includes lens means having the same focal length as said objective lens and having its nodal point coplanar with the nodal point of the objective lens.

3. The system according to claim 1 wherein said second support means mounts said first and second detection means and said second beam directing means.

4. The system according to claim 1 wherein said portion of said first appraisal sub-system is coplanar with the area of the transparency which is struck by wave energy from said second beam directing means, said second appraisal sub-system serving to maintain said portion of said first appraisal sub-system and said areat in coplanar relationship during buckling or popping of the transparency.

5. The system according to claim 1 wherein said first appraisal sub-system is responsive to variations in the distances of said screen and said portion of said first subsystem from said portion of said first beam directing means and moves the latter to maintain a predetermined relationship between such distances.

6. An automatic focusing system for a projector of the type having a movably mounted objective lens for focusing a transparency image on a projection screen comprising:
(a) a first appraisal sub-system including first means movable with the objective lens, second means movable relative to the objective lens and third means responsive to variation in the distance between said screen and said first means and the distance between said second means and said first means and for moving the latter to maintain a predetermined relationship between said distances;
(b) a second appraisal sub-system for detecting popping or buckling of a portion of the transparency and for moving said second means to maintain a predetermined spatial relationship between the latter and said portion of the transparency.

7. The system according to claim 6 further defined by:
(a) said first appraisal sub-system including:
  (1) first wave energy beam directing means defining said first means;
  (2) first detection means responsive to displacement of wave energy thereon;
  (3) first motive means operated by said first detection means upon activation thereof for moving said first beam directing means and said objective lens;
(b) said second appraisal sub-system including:
  (1) second detection means responsive to displacement of wave energy thereon; and
  (2) second motive means operated by said second detection means upon activation thereof for moving said second.

8. The system according to claim 6 wherein said first means comprises lens means having the same focal length as said objective lens with the nodal point of the latter coplanar with the nodal point of said lens means and wherein said predetermined spatial relationship is a coplanar relationship.

9. An automatic focusing system for a projector of the type having a movably mounted objective lens for focusing a transparency image on a projection screen comprising:
(a) a first appraisal sub-system including first detection means for sensing popping or buckling of the transparency and for moving an element relative to the transparency and the objective lens to maintain a predetermined spatial relationship between said element and the transparency; and
(b) a second appraisal sub-system including:
  (1) another element mounted for movement with said objective lens; and
  (2) second detection means for sensing variation in the distance between said screen and said another element and the distance between said first element and said another element and for moving the latter to maintain a predetermined relationship between said distances.

10. The system according to claim 9 wherein said spatial relationship is a coplanar relationship.

11. The system according to claim 9 wherein said another element includes lens means and wherein said predetermined relationship is expressed by the formula:

$$\frac{1}{D}+\frac{1}{d}=\frac{1}{f}$$

wherein D and d are respectively the distances between said screen and said element from said lens means and wherein f is the focal length of said lens means.

12. The system according to claim 11 wherein said objective lens and said lens means have their nodal points coplanar and have the same focal length.

13. The system according to claim 9 wherein at least portions of said first and second detection means are mounted for movement with said element.

14. An automatic focusing system for a projector of the type having a movable objective lens for focusing a transparency image on a projection screen comprising:
(a) a support mounting said objective lens for reciprocal movement along the optical axis of the projector to achieve focusing of a transparency image on the screen;
(b) other lens means mounted on said support for establishing a focusing axis parallel with said optical axis, which other lens means has its nodal point coplanar with the nodal point of said objective lens and has the same focal length as the latter;
(c) wave energy means positioned on said focusing axis such that said lens means is located between the screen and said wave energy means whereby said lens means focuses some of the wave energy on the screen and focuses some of the wave energy reflected from the screen;
(d) detection means responsive to displacement of wave energy thereon;
(e) means cooperating with said lens means for directing to said detection means some of the wave energy which is reflected from the screen;
(f) motive means operated by said detection means upon activation thereof and connected to said support for moving the same;
(g) other detection means responsive to displacement of wave energy thereon;
(h) other wave energy means positioned for directing wave energy to the transparency such that some of the wave energy is reflected from the transparency to said other detection means;
(i) another support mounting said first mentioned wave energy means for reciprocal movement along said focusing axis relative to said transparency and said first mentioned support; and
(j) other motive means operated by said other detection means upon activation thereof and connected to said another support for moving the same to maintain said first mentioned wave energy means in coplanar relation with the area of the transparency which is struck by wave energy from said second mentioned wave energy means.

15. The system according to claim 14 wherein said another support mounts said means cooperating with said lens means, said other wave energy means, said detection means and said other detection means.

References Cited
UNITED STATES PATENTS

| | | | |
|---|---|---|---|
| 2,947,215 | 8/1960 | Mitchell | 353—101 |
| 3,037,423 | 6/1962 | Shutcliff | 352—140 |
| 3,205,744 | 9/1965 | Ewald et al. | 83—670 |
| 3,249,001 | 5/1966 | Stauffet | 352—140 |
| 3,249,006 | 5/1966 | Stauffet | 352—140 |
| 3,450,883 | 6/1969 | Thomas | 353—69 |
| 3,469,925 | 9/1969 | Urbach et al. | 353—101 |
| 3,519,342 | 7/1970 | Kaess | 353—101 |

LEONARD FORMAN, Primary Examiner

S. L. STEPHAN, Assistant Examiner

U.S. Cl. X.R.

352—140; 353—69